UNITED STATES PATENT OFFICE.

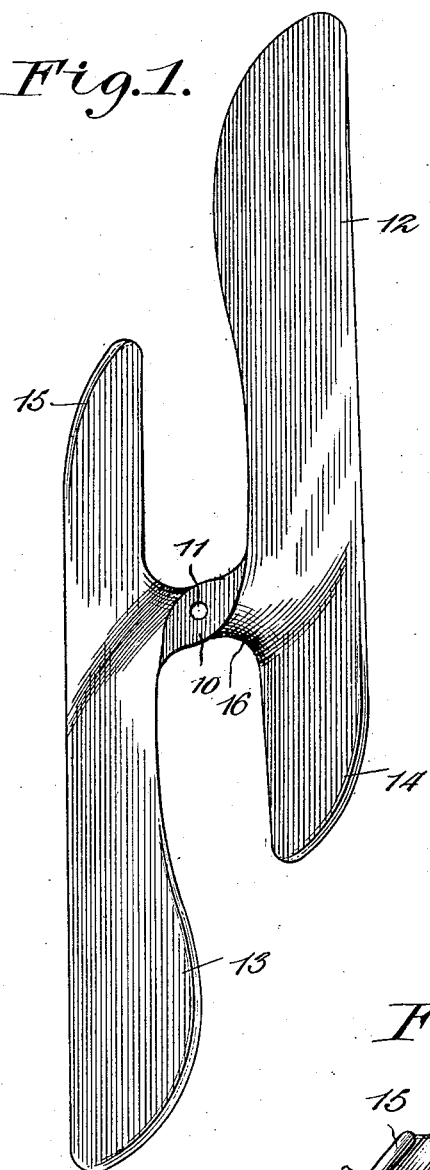
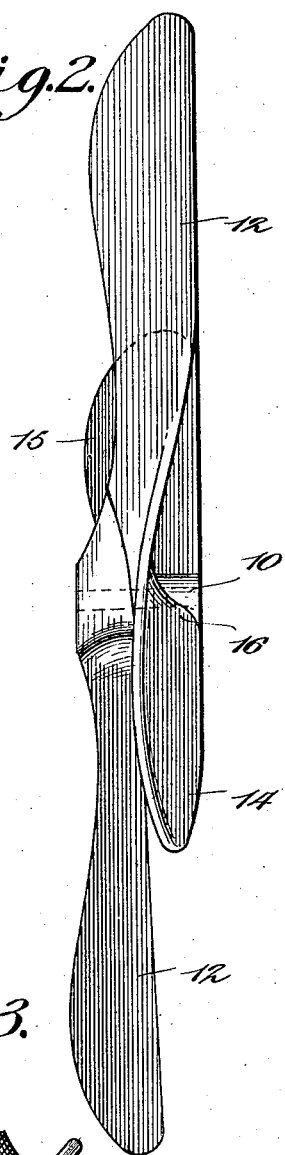
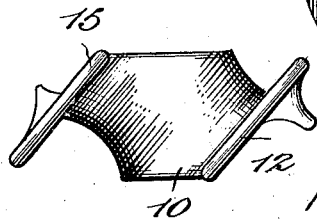

JULIUS BARTHA AND ARTHUR E. GLASSMANN, OF NEW YORK, N. Y., ASSIGNORS TO GLASSMANN-BARTHA WELDING CORP., OF NEW YORK, N. Y.

PROPELLER.

1,417,486. Specification of Letters Patent. Patented May 30, 1922.

Application filed November 15, 1920. Serial No. 424,333.

*To all whom it may concern:*

Be it known that we, JULIUS BARTHA and ARTHUR E. GLASSMANN, subject of Hungary and citizen of the United States, respectively, residing at New York city, in the county of New York and State of New York, have invented new and useful Improvements in Propellers, of which the following is a specification.

This invention relates to improvements in propellers, and is adapted for use on electric fans, aeroplanes, boats, and other like devices.

One of the objects is to provide a device of this nature in which a substantially continuous air propelling surface shall be provided from one end to the other across the axis.

Another object is to provide a device of this nature with pilot or auxiliary blades.

Another object is to cut down the head resistance offered by the hub.

Another object is to so position the blades that there shall be no dead centering of the device.

With these and incidental objects in view the invention resides in certain novel features of construction hereinafter specifically set forth and claimed and fully shown in the accompanying drawing, in which:—

Figure 1 is a front elevation of our improved propeller.

Figure 2 is a top plan view of the same.

Figure 3 is an end elevation of Figure 1.

Like characters of reference refer to like parts in all views.

This invention contemplates the providing of a propeller in which the blades shall be attached at a tangent to the hub and each large blade shall be provided with a corresponding leader or pilot blade and the hub and blades shall all be constructed so as to provide a propeller of true screw formation in which the size of the hub and its consequent head resistance can be so materially reduced as to be practically eliminated.

Referring to the drawing in detail, 10 represents the hub of a propeller formed with a bearing or pivot aperture 11, and provided with a pair of large blades 12 and 13 which are formed integral with the hub and extend therefrom at a tangent to the hub. Small blades 14 and 15 are provided and connected to the blades 12 and 13, respectively. The hub is cut in screw formation at 16 so as to merge into the blades, the whole structure forming a screw with the front of the hub forming a point as in a drill.

In operation, the blades 14 and 15 make the initial cut to be followed up by the blades 13 and 12, respectively. It will noted that while blade 14 is formed out from blade 12, it makes the initial or pilot cut for blade 13 and likewise blade 15 is formed out from blade 13 but is the pilot for blade 12. The principle involved is similar to that used in drilling, where a small drill precedes the larger one in cutting a hole.

The ordinary propeller hub is round and quite large and in operation offers considerable head resistance and gives no aid whatever. In the present invention the screw formation of the hub cuts down the head resistance and also actually assists the blades in their propelling action.

While there has been described what is deemed to be the most desirable embodiment of the invention, it is obvious that many details could be modified without in any way departing from the spirit of the invention, and we therefore do not limit ourselves to the exact details of construction herein set forth nor to anything less than the whole of the invention limited only by the appended claims.

What is claimed as new is:—

1. A propeller having a hub, a plurality of primary blades extending therefrom, and a plurality of secondary blades extending from said primary blades and adapted to co-act as pilots for said primary blades all of said elements being merged into each other in screw formation.

2. A propeller comprising a hub, a plurality of major blades, and a plurality of minor blades, all of said elements being merged into each other in screw formation.

In testimony whereof we have affixed our signatures.

JULIUS BARTHA.
ARTHUR E. GLASSMANN.